United States Patent
Subburaj et al.

(10) Patent No.: US 12,481,483 B2
(45) Date of Patent: Nov. 25, 2025

(54) AUTOMATED GENERATION OF WEB APPLICATIONS BASED ON WIREFRAME METADATA GENERATED FROM USER REQUIREMENTS

(71) Applicant: Tata Consultancy Services Limited, Mumbai (IN)

(72) Inventors: Selvi Subburaj, Chennai (IN); Rekha Venkatachalam, Chennai (IN); Bhanu Raj, Chennai (IN); Nithya Sekar, Chennai (IN); Murugadoss Ramachandran, Chennai (IN); Sandhyalakshmi Subramanian, Chennai (IN); Dineshkumar Velusamy, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 238 days.

(21) Appl. No.: 18/340,919

(22) Filed: Jun. 26, 2023

(65) Prior Publication Data
US 2024/0004620 A1    Jan. 4, 2024

(30) Foreign Application Priority Data
Jun. 30, 2022    (IN) .............................. 202221037837

(51) Int. Cl.
*G06F 8/35* (2018.01)
*G06F 8/10* (2018.01)
(Continued)

(52) U.S. Cl.
CPC .................. *G06F 8/35* (2013.01); *G06F 8/10* (2013.01); *G06F 8/38* (2013.01); *G06F 8/60* (2013.01)

(58) Field of Classification Search
CPC ..... G06F 8/35; G06F 8/10; G06F 8/38; G06F 8/60; G06F 8/36; G06F 8/30
See application file for complete search history.

(56) References Cited

U.S. PATENT DOCUMENTS

| 7,886,222 B2 * | 2/2011 | Bagare ..................... G06F 8/10 |
| | | 715/234 |
| 10,175,957 B1 | 1/2019 | DeAnna et al. |

(Continued)

FOREIGN PATENT DOCUMENTS

CN    110647317 A    1/2020

OTHER PUBLICATIONS

Saputra, D. G., & Azizah, F. N. (2013). A metadata approach for building web application user interface. Procedia Technology, 11, 903-911. (Year: 2013).*

(Continued)

*Primary Examiner* — Wei Y Mui
*Assistant Examiner* — Vivian Weijia Duan
(74) *Attorney, Agent, or Firm* — Finnegan, Henderson, Farabow, Garrett & Dunner LLP

(57) ABSTRACT

Web application generation using conventional predefined template and data model approach is a technical limitation for varying user requirements. Embodiments herein provide a method and system for automated generation of web applications based on wireframe metadata generated from user requirements for a web application received in unstructured data format. The user requirements comprising a description document, and at least one of actor, requirements, use case number, use case name, and data to be collected is parsed to generate the wireframe metadata using NLP and wireframe generation rules. The wireframe metadata provides data structure of webpage details of webpages of the web application comprising a page name, a menu (Continued)

name, field details, a field component type, an action to be performed and an additional information. From the wireframe metadata data models are created dynamically using data modelling rules in accordance with user requirements along with task lists to generate web application.

9 Claims, 11 Drawing Sheets

(51) Int. Cl.
    *G06F 8/38*     (2018.01)
    *G06F 8/60*     (2018.01)

(56) References Cited

U.S. PATENT DOCUMENTS

| | | | |
|---|---|---|---|
| 10,216,494 B2* | 2/2019 | Stachura | G06F 40/109 |
| 11,256,484 B2* | 2/2022 | Nikumb | G06F 8/38 |
| 2016/0266878 A1* | 9/2016 | Mankovskii | G06F 8/38 |

OTHER PUBLICATIONS

Kuznetcov, I., "Metadata Editor for Digital Libraries of Publications", (Spring 2020). (Year: 2020).*

* cited by examiner

200

202 — extracting a plurality of user requirements for a web application by processing user inputs in natural language via NLP, wherein the user inputs are received in form of a predefined row-column template or a description document, and wherein the plurality of user requirements comprise a description and at least one of actor, requirements, use case number, use case name, and data to be collected

204 — generating a wireframe metadata by parsing the plurality of user requirements using a plurality of wireframe generation rules, wherein the wireframe metadata provides data structure of webpage details of each webpage of a plurality of webpages of the web application, wherein the webpage details of each webpage comprises a page name for each page, a menu name, field details, a field component type, an action to be performed and an additional information

206 — creating a plurality of task lists for generating the web application by processing the wireframe metadata, wherein each of the plurality of task lists is created by analyzing the wireframe metadata by a wireframe analyzer using a task classification library to determine a plurality of task scripts to be grouped as a task creating the data model is created by applying a plurality of data modelling rules

FIG. 2A

Use Case 1 – Time Sheet- User Requirement's sheet

| Actor | Requirements | Use case Number | Use Case | Data to be Collected | Description |
|---|---|---|---|---|---|
| Employee | Employee can be able to log their timesheet | UC1 | Timesheet entry | User ID, Working hrs, Date, Task Details | Employee can be able to log their working hrs and task names daily |
| Employee | Employee can be able to Edit their timesheet | UC2 | Edit Timesheet | User ID, Working hrs, Date, Task Details | Employee can be able to edit their working hrs. and task names. |
| Supervisor | Supervisor can be able to view the timesheet details of their team | UC3 | View Timesheet | User ID, Working hrs, Date, Task Details | Supervisor can be able to view working hrs. and tasks name of his team |
| Supervisor | Supervisor can be able to view and approve the timesheet details of their team | UC4 | Approve Timesheet | User ID, Working hrs, Date, Task Details, Approver comments, approver name | Supervisor can be able to approve working hrs. and tasks name of his team |
| Manager/GL | Group Lead (GL) can be able to view High level timesheet analysis report | UC5 | Timesheet Dashboard | User ID, Working hrs, Date, Task Details, Approver comments, approver name | Group Lead (GL) can be able to view dashboard of Timesheet details with the following metrics, Monthly working hrs. of a team, Heavy hitters etc. |

FIG. 3

Step 1: Data Parser

| Actor | Requirements | Use case Number | Use Case | Data to be Collected | Description |
|---|---|---|---|---|---|
| Employee | Employee can be able to log their timesheet | UC1 | Timesheet entry | User ID, Working hrs., Date, Task Details | Employee can be able to log his/her working hrs. and task names daily |

| Use case ID | Rule Name | Result |
|---|---|---|
| UC1 | Page Name ⇐ | Timesheet Entry |
| UC1 | Menu ⇐ | Employee |
| UC1 | Field Names ⇐ | User ID, Working Hrs, Date, Task Details |
| UC1 | Action ⇐ | Insert |

```
{
  "PageName":"Timesheet entry",
  "MenuName":"Employee",
  "fieldDetails":[
    {
      "fieldName":"User_ID",
      "ComponentType":"Label",
      "inputFrom":".Session-LoginID
    },
  ]
}
```

FIG. 4

```
System Generated UI wireframe metadata
[ {
    "PageName":"Timesheet entry",
    "MenuName":"Employee",
    "fieldDetails":[
      {
        "fieldName":"Employee_ID",
        "ComponentType":"Label",
        "inputFrom" :Session-LoginID
      },
      {
        "fieldName":"Work_Hrs",
        "ComponentType":"TextBox",
        "inputFrom" :"user"
      },
    {
        "fieldName":"Date",
        "ComponentType":"Date",
        "inputFrom" :"user"
      },
```

FIG. 5A

```
{
    "fieldName":"Task Details",
    "ComponentType":"Dropdown"
    "inputFrom":"API"
    "API" : {onload: { "URL" : http://ultimatix.com/API,"Param":
{Empid:session-login}
            }
        }
    "Action" : { type: onselect,"event": showhide(this)}

},
{
  "fieldName":"SubmitData",
  "ComponentType":"Button",
  "Action":{
    "type":"onclick",
    "event":"finalsubmit"
  }
 }
 ]
},
```

FIG. 5B

Step 2: Wireframe Analyzer

| Use case ID | Rule Name | Result |
|---|---|---|
| UC1 | Page Name | Timesheet Entry |
| UC1 | Menu | Employee |
| UC1 | Field Names | User ID, Working hrs., Date, Task Details |
| UC1 | Action | Insert |

| Use Case ID | Task Name | Task Group |
|---|---|---|
| UC1 | Create Page with name Timesheet | UI Service |
| UC1 | Create Menu with name Employee | Authorization |
| UC1 | Add Timesheet page into Employee Menu | Authorization |
| UC1 | Add text box User ID in the page Timesheet | UI Services |
| UC1 | Add working hrs. in the page Timesheet | UI Services |
| UC1 | Add numeric Validation for Working hrs. | Validation |

FIG. 6

Step 3: Task Generator

| Use Case ID | Task Name | Task Group | Code / Configuration |
|---|---|---|---|
| UC1 | Create Page with name Timesheet | UI Service | \<html\>\<Title\>Timesheet\</title\>...... \</Html\> |
| UC1 | Create Menu with name Employee | Authorization | Menu creation Configuration script |
| UC1 | Add Timesheet page into Employee Menu | Authorization | Menu Page relationship Config Script |
| UC1 | Add text box User ID in the page Timesheet | UI Services | \<input type="Text" id="User_ID"/\> |
| UC1 | Add working hrs. in the page Timesheet | UI Services | \<input type="Text" id="Working_Hours"/\> |
| UC1 | Add numeric Validation for Working hrs. | Validation | Number_Validation Script code |

FIG. 7

Step 4: Integration and deployment

| Use Case ID | Task Name | Task Group | Code / Configuration |
|---|---|---|---|
| UC1 | Create Page with name Timesheet | UI Service | <html><Title>Timesheet</title>.....</Html> |
| UC1 | Create Menu with name Employee | Authorization | Menu creation Configuration script |
| UC1 | Add Timesheet page into Employee Menu | Authorization | Menu Page relationship Config Script |
| UC1 | Add text box User ID in the page Timesheet | UI Services | <input type="Text" id="User_ID"/> |
| UC1 | Add working hrs in the page Timesheet | UI Services | <input type="Text" id="Working_Hours"/> |
| UC1 | Add numeric Validation for Working Hrs | Validation | Number_Validation Script code |

➤ File Generator organizes all the code and create pages
➤ For every use case one page is created
➤ All pages are packaged and deployed as application

FIG. 8

AUTOMATED GENERATION OF WEB APPLICATIONS BASED ON WIREFRAME METADATA GENERATED FROM USER REQUIREMENTS

PRIORITY CLAIM

This U.S. patent application claims priority under 35 U.S.C. § 119 to: Indian Patent Application No. 202221037837, filed on 30 Jun. 2022. The entire contents of the aforementioned application are incorporated herein by reference.

TECHNICAL FIELD

The embodiments herein generally relate to the field of generation of web applications and, more particularly, to a method and system for automated generation of web applications based on wireframe metadata generated from user requirements.

BACKGROUND

Automation tools for software development or application development is a current area of research and development. Efforts have been made in bringing automation step wise, and entire end to end automation in web application generation still has limitations. Template based generation of applications is a common approach, wherein user requirements are mapped to one among the predefined templates and accordingly code generations proceeds based on defined data models. For example, in an existing method multiple templates for various applications are predesigned and maintained in a template library along with a predefined data model. However, it can be understood the predefined template and predefined data model approach poses a technical limitation when user requirements do not fit the template. Similarly, for varying user requirements the required data model needs to be appropriately generated. Thus, the static data model does not serve the purpose when user requirements are widely varying for varied type of applications. Furthermore, some existing methods refer to spread sheet based requirement gathering, but these spread sheets actually capture or limit to structured data. Thus, technical challenge of capturing user requirements in natural language that is easier for a general end user is hardly addressed in automated web application generation domain.

SUMMARY

Embodiments of the present disclosure present technological improvements as solutions to one or more of the above-mentioned technical problems recognized by the inventors in conventional systems.

For example, in one embodiment, a method for automated web application generation is provided. The method includes receiving a plurality of user requirements for a web application to be generated in unstructured data format via a predefined row-column template or a description document. The plurality of user requirements comprise a description and at least one of actor, requirements, use case number, use case name, and data to be collected. Further, the method includes generating a wireframe metadata by parsing the plurality of user requirements using a Natural Language Processing (NLP) technique and a plurality of wireframe generation rules associated with a plurality of webpage details of each webpage of a plurality of webpages to be generated for the web application. The wireframe metadata provides data structure of the plurality of webpage details of each webpage and comprise a page name for each webpage, a menu name, field details, a field component type, an action to be performed and an additional information. Furthermore, the method includes creating a plurality of task lists for generating the web application by processing the wireframe metadata. Each of the plurality of task lists is created by analyzing the wireframe metadata by a wireframe analyzer using a task classification library to determine a plurality of task scripts to be grouped as a task under each of the plurality of task lists. Further, the method includes dynamically creating a data model by applying a plurality of data modelling rules, creating the data model comprising: creating every page name in the wireframe metadata as a transaction table, wherein a plurality of fields is added as a plurality of table columns; creating a plurality of master tables for the field component type comprising at least one of a dropdown, data list, and a checkbox; grouping into master table details repeated field names in across the plurality of web pages; and identifying data type of the fields by using the field component type and validation names. The created data model is associated with a corresponding transaction table associated with every page name. Furthermore, the method includes obtaining a code syntax for each of the plurality of tasks in the task list using a syntax library. Further, the method includes generating a plurality of User Interface (UI) pages using the code syntax obtained for each task in each of the plurality of task lists, wherein input data to be received via the plurality of UI pages is updated in the corresponding transaction table and the plurality of master tables. Furthermore, the method includes packaging the UI pages as the web application for deploying the web application.

In another aspect, a system for automated web application generation is provided. The system comprises a memory storing instructions; one or more Input/Output (I/O) interfaces; and one or more hardware processors coupled to the memory via the one or more I/O interfaces, wherein the one or more hardware processors are configured by the instructions to receive a plurality of user requirements for a web application to be generated in unstructured data format via a predefined row-column template or a description document. the plurality of user requirements a description and at least one of actor, requirements, use case number, use case name, and data to be collected. Further, the one or more hardware processors are configured to generate a wireframe metadata by parsing the plurality of user requirements using a Natural Language Processing (NLP) technique and a plurality of wireframe generation rules associated with a plurality of webpage details of each webpage of a plurality of webpages to be generated for the web application. The wireframe metadata provides data structure of the plurality of webpage details of each webpage and comprise a page name for each webpage, a menu name, field details, a field component type, an action to be performed and an additional information. Further, the one or more hardware processors are configured to create a plurality of task lists for generating the web application by processing the wireframe metadata. Each of the plurality of task lists is created by analyzing the wireframe metadata by a wireframe analyzer using a task classification library to determine a plurality of task scripts to be grouped as a task under each of the plurality of task lists. Furthermore, the one or more hardware processors are configured to dynamically create a data model by applying a plurality of data modelling rules, creating the data model comprising: creating every page name in the wireframe metadata as a transaction table, wherein a plurality of fields is added as a plurality of table columns; creating a plurality of master tables for the field component type comprising at least one of a dropdown, data list, and a checkbox; grouping into master table details repeated field names in across the plurality of web pages; and identifying data type of the fields by using the field component type and validation names. The created data model is associated with a corresponding transaction table associated with every page name. Further, the one or more hardware processors are configured to obtain a code syntax for each of the plurality of tasks in the task list using a syntax library. Further, the one or more hardware processors are configured to generate a plurality of User Interface (UI) pages using the code syntax obtained for each task in each of the plurality of task lists, wherein input data to be received via the plurality of UI pages is updated in the corresponding transaction table and the plurality of master tables. Furthermore, the one or more hardware processors are configured to package the UI pages as the web application for deploying the web application. In yet another aspect, there are provided one or more non-transitory machine-readable information storage mediums comprising one or more instructions, which when executed by one or more hardware processors causes a method for automated we application generation.

The method includes receiving a plurality of user requirements for a web application to be generated in unstructured data format via a predefined row-column template or a description document. the plurality of user requirements comprise a description and at least one of actor, requirements, use case number, use case name, and data to be collected. Further, the method includes generating a wireframe metadata by parsing the plurality of user requirements using a Natural Language Processing (NLP) technique and a plurality of wireframe generation rules associated with a plurality of webpage details of each webpage of a plurality of webpages to be generated for the web application. The wireframe metadata provides data structure of the plurality of webpage details of each webpage and comprise a page name for each webpage, a menu name, field details, a field component type, an action to be performed and an additional information. Furthermore, the method includes creating a plurality of task lists for generating the web application by processing the wireframe metadata. Each of the plurality of task lists is created by analyzing the wireframe metadata by a wireframe analyzer using a task classification library to determine a plurality of task scripts to be grouped as a task under each of the plurality of task lists. Further, the method includes dynamically creating a data model by applying a plurality of data modelling rules, creating the data model comprising: creating every page name in the wireframe metadata as a transaction table, wherein a plurality of fields is added as a plurality of table columns; creating a plurality of master tables for the field component type comprising at least one of a dropdown, data list, and a checkbox; grouping into master table details repeated field names in across the plurality of web pages; and identifying data type of the fields by using the field component type and validation names. The created data model is associated with a corresponding transaction table associated with every page name. Furthermore, the method includes obtaining a code syntax for each of the plurality of tasks in the task list using a syntax library. Further, the method includes generating a plurality of User Interface (UI) pages using the code syntax obtained for each task in each of the plurality of task lists, wherein input data to be received via the plurality of UI pages is updated in the corresponding transaction table and the plurality of master tables. Furthermore, the method includes packaging the UI pages as the web application for deploying the web application. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A through 2B (collectively referred as FIG. 2) is a flow diagram illustrating a method for automated generation of web applications based on wireframe metadata generated from user requirements using the system of FIG. 1A, in accordance with some embodiments of the present disclosure.

FIG. 3 illustrates a time sheet of an exemplary use case explaining steps of the method while generating a timesheet web application for an organization that tracks workhours of employees, in accordance with some embodiments of the present disclosure.

FIG. 4 illustrates a data parser of an exemplary use case explaining steps of the method while generating a timesheet web application for an organization that tracks workhours of employees, in accordance with some embodiments of the present disclosure.

FIGS. 5A and 5B illustrate a system generated user interface (UI) wireframe metadata of an exemplary use case explaining steps of the method while generating a timesheet web application for an organization that tracks workhours of employees, in accordance with some embodiments of the present disclosure.

FIG. 6 illustrates a wireframe analyze of an exemplary use case explaining steps of the method while generating a timesheet web application for an organization that tracks workhours of employees, in accordance with some embodiments of the present disclosure.

FIG. 7 illustrates a task generator of an exemplary use case explaining steps of the method while generating a timesheet web application for an organization that tracks workhours of employees, in accordance with some embodiments of the present disclosure.

FIG. 8 illustrates an integration and deployment of an exemplary use case explaining steps of the method while generating a timesheet web application for an organization that tracks workhours of employees, in accordance with some embodiments of the present disclosure.

Figure 1A:
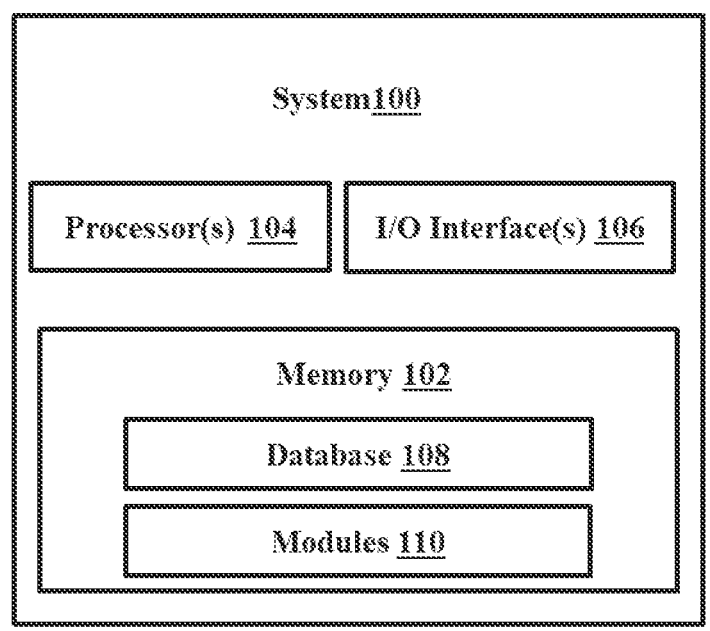
FIG. 1A is a functional block diagram of a system for automated generation of web applications based on wireframe metadata generated from user requirements, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure provide a method and system for automated generation of web applications based on wireframe metadata generated from user requirements. The method includes receiving user requirements for a web application in unstructured data format via a predefined row-column template or a description document. The plurality of user requirements comprise a description and at least one of actor, requirements, use case number, use case name, and data to be collected. Further, a wireframe metadata is generated by parsing the plurality of user requirements using Natural Language Processing (NLP) and a plurality of wireframe generation rules. The wireframe metadata provides data structure of webpage details of webpages of the web application comprising a page name, a menu name, field details, a field component type, an action to be performed and an additional information. From the wireframe metadata data models are created dynamically using data modelling rules to appropriately fit the user requirements. Also, task lists are created from the wireframe metadata. The data model and task list are then used to generate the code syntax for the web application. based on from wireframe metadata.

Thus, the method provides end to end complete automation approach for the web application generation for varying user requirements in unstructured format by dynamically generating data model based on the wireframe metadata. This eliminates user intervention, speeding up application generation time and effectively enhancing user experience.

Referring now to the drawings, and more particularly to FIGS. 1A through 8, where similar reference characters denote corresponding features consistently throughout the figures, there are shown preferred embodiments and these embodiments are described in the context of the following exemplary system and/or method.

FIG. 1A is a functional block diagram of a system 100 for automated generation of web applications based on wireframe metadata generated from user requirements, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 such as module for generating wireframe meta data, data models, task lists (not shown) and the like. Thus, the plurality of modules 110 include programs or coded instructions that supplement applications or functions performed by the system 100 for executing different steps involved in the process of generation of web applications based on wireframe metadata, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown). The plurality of modules 110 may include computer-readable instructions that supplement applications or functions performed by the system 100. Further, the memory 102 may comprise information pertaining to input(s)/output(s) of each step performed by the processor(s) 104 of the system 100 and methods of the present disclosure.

Further, the memory 102 includes a database 108. The database (or repository) 108 may include a plurality of abstracted piece of code for refinement and data that is processed, received, or generated as a result of the execution of the plurality of modules in the module(s) 110. For example, the database 108 may store user requirements, wireframe metadata rules, wireframe metadata, data models, data modeling rules, task lists, generated code of the web application and the like.

Although the database 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 1B through FIG. 8.

Figure 1B:
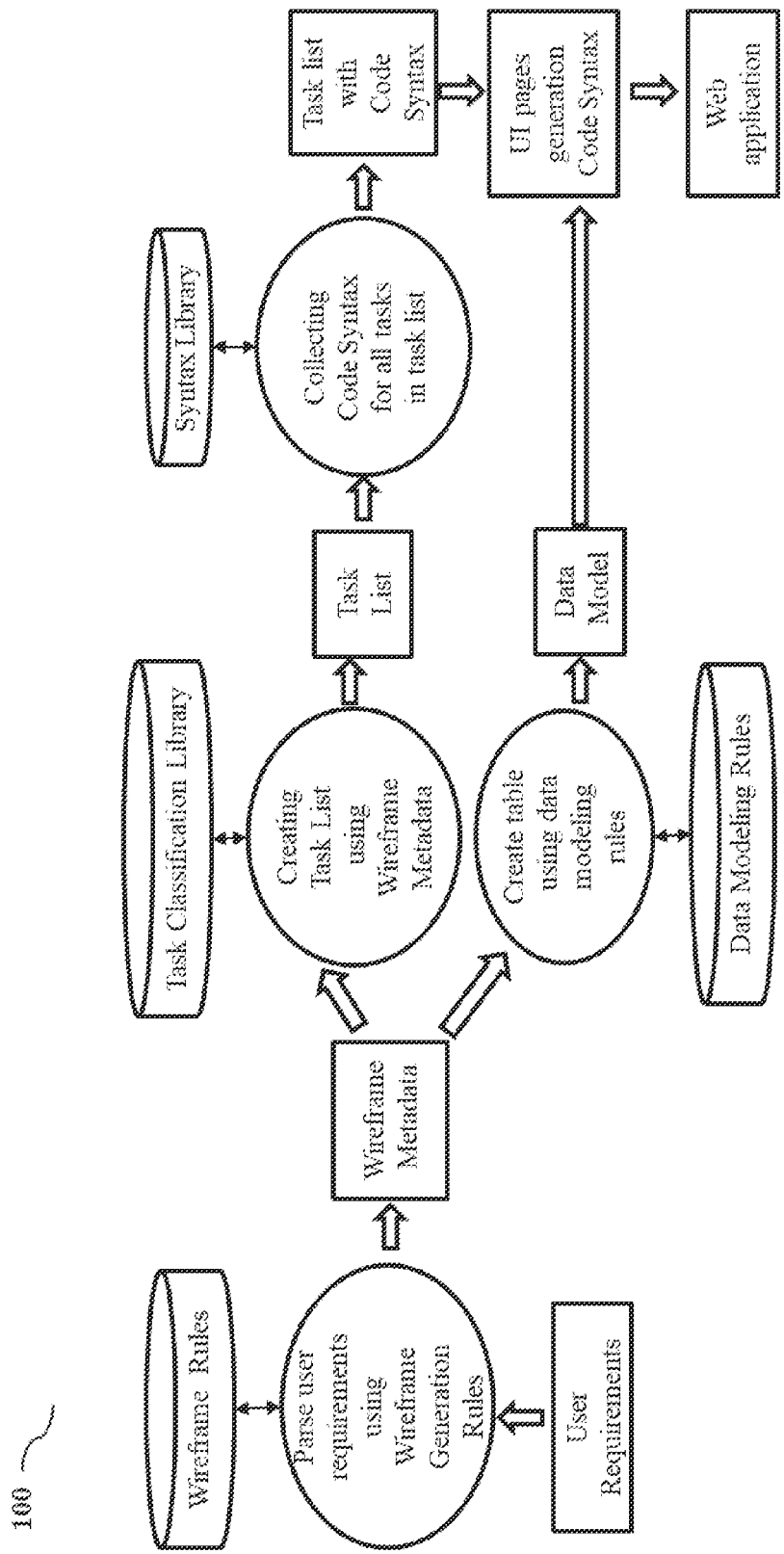
FIG. 1B illustrates an architectural and process overview of the system of FIG. 1A, in accordance with some embodiments of the present disclosure.

FIG. 1B illustrates an architectural and process overview of the system 100 of FIG. 1A, in accordance with some embodiments of the present disclosure and is explained in conjunction with FIG. 2.

Figure 2B:
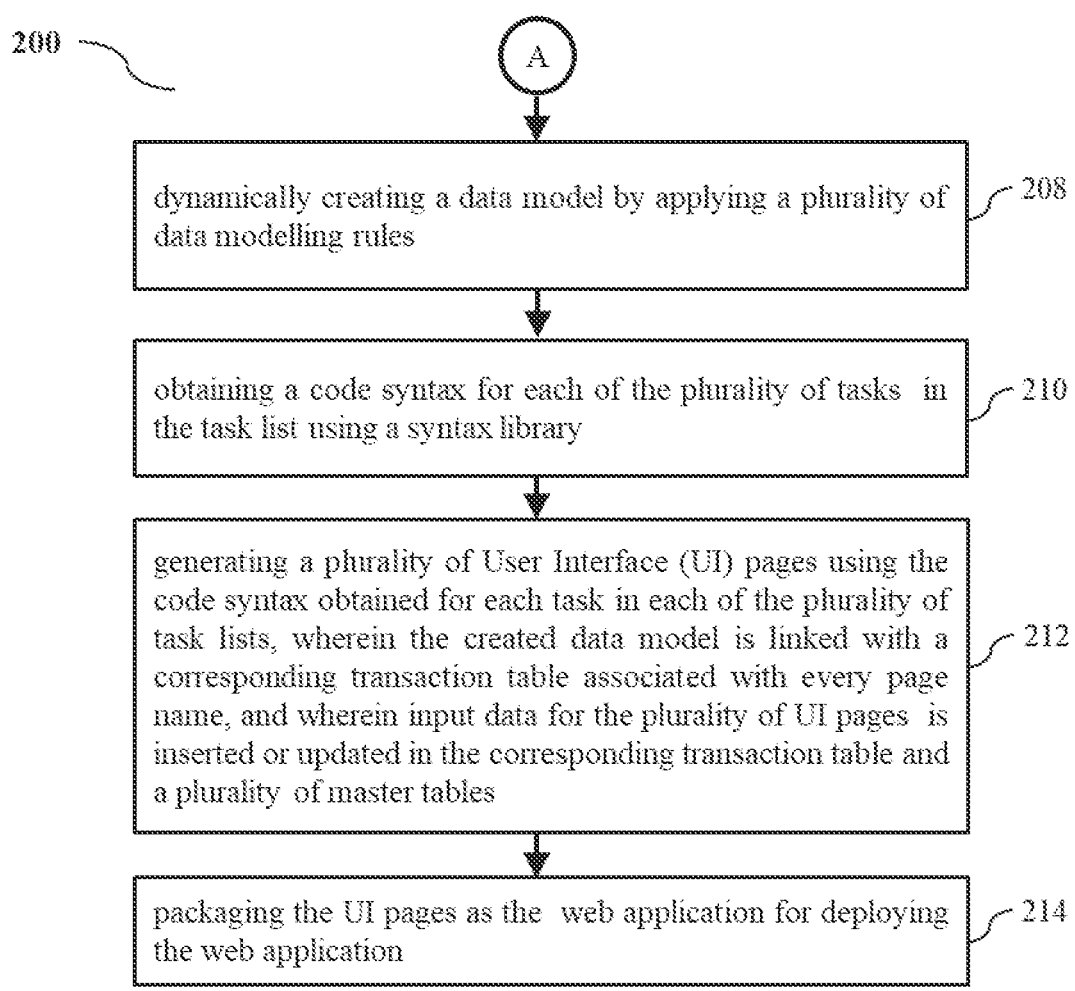

FIGS. 2A through 2B (collectively referred as FIG. 2) is a flow diagram illustrating a method 200 for automated generation of web applications based on wireframe metadata generated from user requirements using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1A, 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 receive a plurality of user requirements for a web application to be generated in unstructured data format via a predefined row-column template or a description document. The received user requirements minimum should provide a description and additionally can provide at least one of actor, requirements, use case number, use case name, and data to be collected. Refer to FIG. 3 depicting user requirements provided in the predefined row-column template for a timesheet web application for an organization that tracks workhours of employees. Use case indicates required rights or functions to be assigned to each actor, where description elaborates the functions specifying the actors. Thus, if only description document is shared by an end user, NLP techniques well known in the art are applied to identify the actors, use cases by assigning use case numbers. Once user requirements are analyzed, the user requirements are available in form of the predefined template. The template is a generalized template which can take in requirements for any web application across varied domains.

Thereafter, at step 204 of the method 200 the one or more hardware processors generate the wireframe metadata by parsing the plurality of user requirements using Natural Language Processing (NLP) techniques and the plurality of wireframe generation rules associated with a plurality of webpage details of each webpage of a plurality of webpages to be generated for the web application. The wireframe metadata provides data structure of webpage details of each webpage of a plurality of webpages of the web application. The webpage details of each webpage comprises a page name for each page, a menu name, field details, a field component type, an action to be performed and an additional information. The additional information comprises a page style, field validation details, API Details, comments, tool tip and navigation information. FIG. 4 depicts how a received user requirement is converted to the wireframe meta data associated with an example page named 'Timesheet entry' of the use case of FIG. 3. First table shows the raw requirements, second table shows the identified wireframe metadata parameter values by using wireframe rules, also referred to as metadata identification rules. Third table shows the final metadata, for example, the JavaScript Object Notation (JSON) The detailed wireframe generation rules to identify the wireframe metadata parameter values for webpage details of each page are as follows:

Page Name Identification Rules
    Rule 1: Use case Name to be taken as page name
    Rule 2: If Use case name is not available, the 'page name' to be extracted from 'Description' column by using NLP. Noun phrase of the use case sentence will be identified using NLP and it will be marked as Page name Menu Name
    Rule 3: Actor to be taken from column 'Menu name'
    Rule 4: If actor is not available in the input, the menu name to be extracted from Description by using NLP. Common noun of the description to be identified using NLP and to be marked as Menu name Field Details
    Rule 5: Field details are taken from 'data to be collected' column
    Rule 6: If data to be collected value is not available, The Field names to be extracted from the 'descriptions' column by using NLP. Using NLP, proper nouns and normal nouns are identified from the 'description' and the used as 'field names'.

Component Type of the Field
    Rule 7: Component type of the filed will be identified using the name of the field. Text classification with NLP is used to classify the field name as groups.

Every group represents a field component type (component type) such as text box, label, dropdown, text area etc. The text classification used is a well-known machine learning technique.

Action to be Performed
    Rule 8: All identified web pages to have an action to be performed, and to be identified by using NLP. First, using NLP, verbs are identified from the 'description'. Next, the verbs are compared with synonyms of the word insert, edit, and delete. Based on the match the action to be performed will be identified.

Additional Information
    Rule 9: Information from 'additional requirements' column to be added directly into the wire frame metadata. Example of additional information are validation, component style etc.

FIG. 5A and FIG. 5B depict the generated wireframe metadata by parsing the user requirements of FIG. 3 using NLP techniques and the wireframe generation rules (rule 1 through 9) above.

Once the wireframe metadata is generated, at step 206, the one or more hardware processors 104 create a plurality of task lists for generating the web application by processing the wireframe metadata. Each of the plurality of task lists is created by analyzing the wireframe metadata by a wireframe analyzer using a task classification library to determine a plurality of task scripts to be grouped as a task under each of the plurality of task lists. Thus, the wireframe analyzer analyzes the wire frame metadata and identifies the code generation script names, for example, create page, add text box and so on, by using the task classification library. The task Classification library defines a relationship between the wireframe metadata and task scripts, i.e., task script names and the metadata parameters. The wireframe analyzer is further explained in conjunction with and example in FIG. 6 and FIG. 7. The plurality of task lists comprise User Interface (UI) task list, a validation task, an API task list, business process details, and the like.

User Interface Task list: It has the list of user interface creation scripts (task Names). For example, a script like: Create Empty UI page, Add UI components inside Empty UI page, Add CSS Styling for the components. Validation Details Task List: This includes validation scripts. Examples of validation scripts are empty validation, number validation, email validation, mobile number validation, etc.

API task List: API task list include list of scripts to connect third party webservices to get the data and display in the UI pages.

Business Process Details: Includes list of business logic script. Examples of the scripts are insert data, delete data, and edit data.

FIG. 6 depicts sample input and output of the wireframe analyzer. The wireframe analyzer analyzes the metadata and finds the code generation script names (Ex: create page, add text box) by using the task classification library.

FIG. 7 depicts the task generator, which generates the output code by using the task name and task group name identified by the task analyzer. Every task name is related to a task generation script. The task generation scripts uses tag library and generates the final output code.

Referring back to steps of the method 200, at step 208, the one or more hardware processors 104 dynamically create a data model by applying the plurality of data modelling rules. The rule based dynamic creation of the data model is explained in steps a-d below:
  a) Create every page name in the wireframe metadata as a transaction table, wherein a plurality of fields are added as a plurality of table columns.
  b) Create a plurality of master tables for the field component type comprising at least one of a dropdown, data list, and a checkbox.
  c) Group into master table details repeated field names in across the plurality of web pages.
  d) Identify data type of the fields by using the field component type and validation names.

At step 210, the one or more hardware processors 104 obtain a code syntax for each of the plurality of tasks in the task list using a syntax library. Thereafter, at step 212, the one or more hardware processors 104 generate a plurality of User Interface (UI) pages using the code syntax obtained for each task in each of the plurality of task lists. The created data model is linked with a corresponding transaction table associated with every page name. An input data for the plurality of UI pages is inserted or updated in the corresponding transaction table and the plurality of master tables. Once code syntax is ready, as depicted in FIG. 8, at step 214 the one or more hardware processors 104 package the UI pages as the web application and is ready for deployment.

Thus, the method provides end to end complete automation approach for the web application generation for varying user requirements received in unstructured format by dynamically generating data model based on the wireframe metadata. This eliminates user intervention, speeding up application generation time and effectively enhancing user experience.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automated generation of web applications, the method comprising:
receiving, by one or more hardware processors, a plurality of user requirements for a web application to be generated via a predefined row-column template or a description document, and the plurality of user requirements comprise a description and at least one of actor, requirements, use case number, use case name, and data to be collected, wherein the plurality of user requirements is received in unstructured data format;
generating, by the one or more hardware processors, a wireframe metadata by parsing the plurality of user requirements using a Natural Language Processing (NLP) technique and a plurality of wireframe generation rules associated with a plurality of webpage details of each webpage of a plurality of webpages to be generated for the web application, wherein the wireframe metadata provides data structure of the plurality of webpage details of each webpage and comprise a page name for each webpage, a menu name, field details, a field component type, an action to be performed, and an additional information,
wherein the page name is extracted by identifying a noun phrase from the description using the NLP technique and marking the noun phrase as the page name, wherein the menu name is extracted by identifying a common noun from the description using the NLP technique and marking the common noun as the menu name,
wherein the field details are extracted by identifying proper nouns and normal nouns from the description using the NLP technique and the proper nouns and the normal nouns are used as the field details,
wherein the field component type is identified using a text classification technique with the NLP technique to classify the field name as groups, wherein each group represents the field component type comprising at least one of a dropdown, a data list, and a checkbox, wherein the text classification technique is a machine learning technique,
wherein the action to be performed is extracted by identifying verbs from the description using the NLP technique, and the verbs are compared with synonyms of words insert, edit, and delete, to identify the action to be performed;
creating, by the one or more hardware processors, a plurality of task lists for generating the web application by processing the wireframe metadata, wherein each of the plurality of task lists is created by analyzing the wireframe metadata by a wireframe analyzer using a task classification library to determine a plurality of task scripts to be grouped as a task under each of the plurality of task lists;
dynamically creating, by the one or more hardware processors, a data model by applying a plurality of data modelling rules, creating the data model comprising:
a) creating every page name in the wireframe metadata as a transaction table, wherein a plurality of fields is added as a plurality of table columns;
b) creating a plurality of master tables for the field component type comprising at least one of the dropdown, the data list, and the checkbox;
c) grouping into at least one of the plurality of master tables repeated field names in across the plurality of web pages; and
d) identifying data type of the fields by using the field component type and validation names;
wherein the created data model is associated with a corresponding transaction table associated with every page name;
obtaining, by the one or more hardware processors, a code syntax for each of the plurality of tasks in the task list using a syntax library;
generating, by the one or more hardware processors, a plurality of User Interface (UI) pages using the code syntax obtained for each task in each of the plurality of task lists, wherein input data to be received via the plurality of UI pages is updated in the corresponding transaction table and the plurality of master tables; and
packaging the UI pages as the web application, by the one or more hardware processors, for deploying the web application.

2. The processor implemented method of claim 1, wherein the additional information comprises a page style, field validation details, API Details, comments, tool tip, and navigation information.

3. The processor implemented method of claim 1, wherein the plurality of task lists comprises User Interface (UI) task list, a validation task, an API task list, business process details, and wherein the task classification library defines a relationship between the wireframe metadata and task scripts.

4. A system for automated generation of web applications, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive a plurality of user requirements for a web application to be generated via a predefined row-column template or a description document, and the plurality of user requirements comprise a description and at least one of actor, requirements, use case number, use case name, and data to be collected, wherein the plurality of user requirements is received in unstructured data format;
generate a wireframe metadata by parsing the plurality of user requirements using a Natural Language Processing (NLP) technique and a plurality of wireframe generation rules associated with a plurality of webpage details of each webpage of a plurality of webpages to be generated for the web application, wherein the wireframe metadata provides data structure of the plurality of webpage details of each webpage and comprise a page name for each webpage, a menu name, field details, a field component type, an action to be performed, and an additional information,
  wherein the page name is extracted by identifying a noun phrase from the description using the NLP technique and marking the noun phrase as the page name,
  wherein the menu name is extracted by identifying a common noun from the description using the NLP technique and marking the common noun as the menu name,
  wherein the field details are extracted by identifying proper nouns and normal nouns from the description using the NLP technique and the proper nouns and the normal nouns are used as the field details,
  wherein the field component type is identified using a text classification technique with the NLP technique to classify the field name as groups, wherein each group represents the field component type comprising at least one of a dropdown, a data list, and a checkbox, wherein the text classification technique is a machine learning technique,
  wherein the action to be performed is extracted by identifying verbs from the description using the NLP technique, and the verbs are compared with synonyms of words insert, edit, and delete, to identify the action to be performed;
create a plurality of task lists for generating the web application by processing the wireframe metadata, wherein each of the plurality of task lists is created by analyzing the wireframe metadata by a wireframe analyzer using a task classification library to determine a plurality of task scripts to be grouped as a task under each of the plurality of task lists;
dynamically create a data model by applying a plurality of data modelling rules, creating the data model comprising:
  a) creating every page name in the wireframe metadata as a transaction table, wherein a plurality of fields is added as a plurality of table columns;
  b) creating a plurality of master tables for the field component type comprising at least one of the dropdown, the data list, and the checkbox;
  c) grouping into at least one of the plurality of master tables repeated field names in across the plurality of web pages; and
  d) identifying data type of the fields by using the field component type and validation names;
  wherein the created data model is associated with a corresponding transaction table associated with every page name;
obtain a code syntax for each of the plurality of tasks in the task list using a syntax library;
generate a plurality of User Interface (UI) pages using the code syntax obtained for each task in each of the plurality of task lists, wherein input data to be received via the plurality of UI pages is updated in the corresponding transaction table and the plurality of master tables; and
package the UI pages as the web application for deploying the web application.

5. The system of claim 4, wherein the additional information comprises a page style, field validation details, API Details, comments, tool tip, and navigation information.

6. The system of claim 4, wherein the plurality of task lists comprises User Interface (UI) task list, a validation task, an API task list, business process details, and wherein the task classification library defines a relationship between the wireframe metadata and task scripts.

7. One or more non-transitory machine-readable information storage mediums comprising one or more instructions which when executed by one or more hardware processors cause:
  receiving, by one or more hardware processors, a plurality of user requirements for a web application to be generated via a predefined row-column template or a description document, and the plurality of user requirements comprise a description and at least one of actor, requirements, use case number, use case name, and data to be collected, wherein the plurality of user requirements is received in unstructured data format;
  generating, by the one or more hardware processors, a wireframe metadata by parsing the plurality of user requirements using a Natural Language Processing (NLP) technique and a plurality of wireframe generation rules associated with a plurality of webpage details of each webpage of a plurality of webpages to be generated for the web application, wherein the wireframe metadata provides data structure of the plurality of webpage details of each webpage and comprise a page name for each webpage, a menu name, field details, a field component type, an action to be performed, and an additional information,
    wherein the page name is extracted by identifying a noun phrase from the description using the NLP technique and marking the noun phrase as the page name,
    wherein the menu name is extracted by identifying a common noun from the description using the NLP technique and marking the common noun as the menu name,
    wherein the field details are extracted by identifying proper nouns and normal nouns from the description using the NLP technique and the proper nouns and the normal nouns are used as the field details,
    wherein the field component type is identified using a text classification technique with the NLP technique to classify the field name as groups, wherein each group represents the field component type comprising at least one of a dropdown, a data list, and a checkbox, wherein the text classification technique is a machine learning technique,
    wherein the action to be performed is extracted by identifying verbs from the description using the NLP technique, and the verbs are compared with synonyms of words insert, edit, and delete, to identify the action to be performed;
  creating, by the one or more hardware processors, a plurality of task lists for generating the web application by processing the wireframe metadata, wherein each of the plurality of task lists is created by analyzing the wireframe metadata by a wireframe analyzer using a task classification library to determine a plurality of task scripts to be grouped as a task under each of the plurality of task lists;
  dynamically creating, by the one or more hardware processors, a data model by applying a plurality of data modelling rules, creating the data model comprising:
    a) creating every page name in the wireframe metadata as a transaction table, wherein a plurality of fields is added as a plurality of table columns;
    b) creating a plurality of master tables for the field component type comprising at least one of the dropdown, the data list, and the checkbox;

c) grouping into at least one of the plurality of master tables repeated field names in across the plurality of web pages; and d) identifying data type of the fields by using the field component type and validation names;

wherein the created data model is associated with a corresponding transaction table associated with every page name;

obtaining, by the one or more hardware processors, a code syntax for each of the plurality of tasks in the task list using a syntax library;

generating, by the one or more hardware processors, a plurality of User Interface (UI) pages using the code syntax obtained for each task in each of the plurality of task lists, wherein input data to be received via the plurality of UI pages is updated in the corresponding transaction table and the plurality of master tables; and packaging the UI pages as the web application, by the one or more hardware processors, for deploying the web application.

8. The one or more non-transitory machine-readable information storage mediums of claim 7, wherein the additional information comprises a page style, field validation details, API Details, comments, tool tip, and navigation information.

9. The one or more non-transitory machine-readable information storage mediums of claim 7, wherein the plurality of task lists comprises User Interface (UI) task list, a validation task, an API task list, business process details, and wherein the task classification library defines a relationship between the wireframe metadata and task scripts.

* * * * *